United States Patent
Tahara et al.

(10) Patent No.: US 8,193,958 B2
(45) Date of Patent: Jun. 5, 2012

(54) SIGNAL REGENERATOR

(75) Inventors: Masayuki Tahara, Kanagawa (JP); Kenji Namba, Tokyo (JP); Tetsuya Nishiyama, Chiba (JP)

(73) Assignee: Texas Instruments Incorporated, Dallas, TX (US)

( * ) Notice: Subject to any disclaimer, the term of this patent is extended or adjusted under 35 U.S.C. 154(b) by 1017 days.

(21) Appl. No.: 12/117,178

(22) Filed: May 8, 2008

(65) Prior Publication Data

US 2009/0219797 A1 Sep. 3, 2009

(30) Foreign Application Priority Data

May 9, 2007 (JP) ................................ 2007-124936

(51) Int. Cl.
*H03M 1/00* (2006.01)
(52) U.S. Cl. .............................. 341/122; 341/50; 341/51
(58) Field of Classification Search .................. 341/122, 341/50, 51; 369/44.34, 44.29, 44.27, 53.31
See application file for complete search history.

(56) References Cited

U.S. PATENT DOCUMENTS

| 6,025,907 | A | 2/2000 | Nakayama et al. |
| 6,992,962 | B1 | 1/2006 | Mashimo et al. |
| 2004/0264315 | A1* | 12/2004 | Kaku .................... 369/44.34 |
| 2005/0105414 | A1 | 5/2005 | Nagara et al. |
| 2005/0128901 | A1* | 6/2005 | Takeda et al. ......... 369/44.29 |
| 2005/0270918 | A1* | 12/2005 | Yen et al. ............. 369/44.27 |
| 2005/0276178 | A1* | 12/2005 | Nishimura et al. ..... 369/44.34 |

FOREIGN PATENT DOCUMENTS

JP 2003203352 A 7/2003

OTHER PUBLICATIONS

PCT Notification of Transmittal of the International Search Report and the Written Opinion of the International Searching Authority, dated Oct. 27, 2008, from the International Searching Authority, Authorized Officer, Sang Moon Soak.

* cited by examiner

*Primary Examiner* — Jean B Jeanglaude
(74) *Attorney, Agent, or Firm* — John J. Patti; Wade J. Brady, III; Frederick J. Telecky, Jr.

(57) ABSTRACT

Pulses that are generated from multiple analog input signals are sampled, and signal elements contained in the analog signals are extracted accurately using the said sampling pulses. Binarization circuits where analog input signals A, B, C, and D are converted into pulse signals; a logic operation circuit that generates a sampling pulse upon receiving the input of the 4 pulse signals; and a sample-and-hold circuit samples and holds an input RF signal based on the sampling pulse in order to extract accurately signal elements contained in said RF signal by means of sampling of the RF signal.

19 Claims, 9 Drawing Sheets

| | Rising Cycle Time | |
|---|---|---|
| | Average [ns] | $\sigma$ [ns] |
| Averaging method | 385.53 | 65.849 |
| Combination sampling method | 393.41 | 51.044 |

Wobble waveform generation comparison results

SIGNAL REGENERATOR

FIELD OF THE INVENTION

The present invention pertains to a signal regenerator that generates a timing signal from an input signal and extracts signal elements contained in the input signal using said timing signal.

BACKGROUND OF THE INVENTION

Guide grooves of a recordable DVD (Digital Versatile Disc) are wobbled slightly, even without recording, in order to extract physical position information and a clock signal to be used for recording. A block configuration of a wobble signal extraction circuit of a conventional optical disc device is shown in FIG. 12. A laser beam hits the disc, the reflected light enters 4 light-receiving elements (tetrameric light-receiving element), and I-V (current-voltage) converted signals A-D are supplied to GCA (Gain Control Amplifier) circuits 2A-2D.

During a recording operation, marks are formed on the disc by means of recording light power, and unrecorded parts are left as spaces. Signals A-D contain signal elements (will be referred to as Write RF signal, hereinafter) for recording and wobble signal elements, and wobble elements with a relatively high C/N (Carrier/Noise) ratio are obtained from the reflected light generated by the light power.

These 4 signals A-D are configured in such a manner that said reflected light hits the guide grooves as sets (A+D) and (B+C), whereby a wobble signal can be obtained based on the difference between them. First, their amplitudes are adjusted coarsely by GCA circuits 2A-2D, (A+D) and (B+C) are computed subsequently by operational amplifiers 3A and 3B, fine gain adjustments are applied to them at GCA circuits 4A and 4B so as to optimize their gain balance, and the wobble elements are extracted by operational amplifier 5. In addition, the purpose of S/H (Sample-and-Hold) circuit 6 is to sample and hold the signal when the markers are formed, and it receives a timing signal that is required for generating the wobble signal elements from a light pulse block of sampling timing control circuit 9. This circuit shown in FIG. 12 generates an accurate wobble signal by means of a sampling method.

On the other hand, S/H circuit 6 is removed from the circuit shown in FIG. 12 in the circuit shown in FIG. 13, which is a block configuration of a circuit for generating a wobble signal by means of an averaging method that involves constant sampling.

In the circuits shown in FIG. 12 and FIG. 13, after only the frequency element required for a wobble signal is allowed to pass BPF (Band-Pass Filter: band-pass type filter) 7, automatic gain control is carried out by AGC (Automatic Gain Control) circuit 8 in order to output a signal with a prescribed amplitude. Here, the method described in Japanese Kokai Patent Application No. 2003-203352, for example, is available as a conventional example for detecting a wobble signal.

First, problems with the averaging method will be described. In the averaging method, the element necessary for control is extracted through averaging processing with the inclusion of the signal used for the marking/spacing, and S/H circuit 6 and sampling timing control circuit 9 shown in FIG. 12 are not required. Thus, an advantage is offered in that a timing does not have to be set for each velocity (write velocity) and each medium. However, as a result, in the case of a recordable disc, because the write power differs from the read power significantly especially during a recording, a significant difference is created in the amount of reflected light. Although significant modulation elements are also extracted from the wobble elements during the formation of the marks, only low-modulation elements are extracted during the formation of the spaces, resulting in the problem that the waveform is ultimately significantly distorted.

In addition, because the averaging method has the following disadvantages, the burden in terms of A/D conversion, correction, and restriction processing tends to increase in order to improve the wobble position detection capability and the clock precision during later-stage processing.

(1) The distortion is corrected by applying averaging processing to the respective extracted mark/space signals by BPF 7. In this case, however, because the modulation elements of the pre-averaged signals output from operational amplifier 5 return to almost zero at the spaces, the C/N ratio of the wobble signal falls more than one half as a result of the averaging processing.

(2) Wobble signal distortion and noise are increased at the mark-space switching points due to fluctuations in the characteristics among the light-receiving elements and the timing.

(3) A highly distorted signal is ultimately output due to mark-space level differences, and the elements become difficult to extract, particularly at the spaces. In addition, said distortion changes while the recording power is being changed so as to obtain the optimum value (OPC processing).

(4) As is the case with the DVD+R standard, when the wobble length and the RF signal pattern length approach each other, the 3 aforementioned points become more influential, and the quality of the wobble signal is ultimately degraded. Incidentally, in the case of a DVD-R, 6.7-31 Write RF (signal) patterns are generated during a half cycle of the wobble. On the other hand, in the case of a DVD+R, 1.1-5.3 are generated, and the RF signal pattern is close to the wobbling cycle.

Next, problems with the sampling method will be described.

During the recording operation, the laser is driven pulsatingly in order to control the output of the write power and the read power. The write pulse generation block controls the pulse output required for each write based on a timing configuration table in order to output the laser at the optimum timing for the given RF signal pattern to be recorded. In addition to the control over the laser pulse, pulse output control for sampling an RF input signal for measurement control is also carried out. Sampling timing control circuit 9 shown in FIG. 12 is used to this end.

Although the reflected light from the medium is affected by the pulse signal, because the positions of the elements required for extracting the wobble signal contained in the reflected light are already known based on the mark-generating timing by sampling timing control circuit 9 in FIG. 12, adjustments are made in order for S/H circuit 6 to carry out the sampling at a stable level, except at the mark-space switching points.

The sampling timing is generated with reference to a recording clock generated from the wobble, and it needs to be set for each recording velocity, medium, and system. In this case, the system refers to the entire system that includes shifting of the timing caused by process fluctuations attributable to the light-reflecting characteristics of each disc, photosensor sensitivity, light-path formation precision, and the different chips used to configure control signals and signals to be controlled, wherein the more the respective elements change, the more difficult the adjustment of the timing.

In addition, when recording on a DVD, wherein the RF signal is configured at a constant linear velocity, at a constant angular velocity (for example, the CAV recording method), the recording clock needs to be follow with changes in the linear velocity, requiring a higher level of clock precision and complicated adjustments.

Sampling timing control circuit 9 is sometimes configured using a chip different from those used for the photodetector and GCA circuits (2A, 2B)-AGC circuit 8. In such case, a sample-and-hold control signal is supplied from the outside, and each chip will have 1 more pin. In addition, because the sampling pulse is propagated through the wiring on the substrate, there are risks of noise and unwanted radiation.

SUMMARY OF THE INVENTION

In view of the aforementioned problems, a general proposition of the present invention is that a sample-and-hold signal be generated internally based on a combination of light-receiving signals in order to compensate for the shortcomings of the averaging method and the sampling method.

This and other objects and features are provided n accordance with one aspect of a signal regenerator of the present invention is a signal regenerator for extracting signal elements that are contained in analog signals regenerated from a light reflected off a disk, wherein the signal regenerator has a sample-and-hold signal generation circuit that generates sample-and-hold signals from 1 or multiple analog input signals obtained from the reflected light or obtained from the light directly by means of photoelectric conversion and a sample-and-hold circuit that samples and outputs the aforementioned analog signals in response to the aforementioned sample-and-hold signals.

In addition, the signal regenerator of an aspect of the present invention may be configured in such a manner that the aforementioned sample-and-hold signal generation circuit has a binarization circuit that compares first, second, third, and fourth analog signals that are generated through photoelectric conversion by a photodetector with first, second, third, and fourth threshold values in order to convert them into first, second, third, and fourth pulse signals and a logic operation circuit that applies a logical AND operation or a logical OR operation to the aforementioned first, second, third, and fourth pulse signals in order to generate the aforementioned sample-and-hold signals.

Furthermore, an arithmetic circuit that applies arithmetic processing to the aforementioned first, second, third, and fourth analog signals may be further provided in order to generate the aforementioned analog signals, whereby the aforementioned first, second, third, and fourth analog signals are generated from the reflected light.

Furthermore, the configuration may be such that the aforementioned arithmetic circuit has a first adder that generates a first sum signal representing the sum of the aforementioned first analog input signal and the aforementioned fourth analog input signal, a second adder that generates a second sum signal representing the sum of the aforementioned second analog input signal and the aforementioned third analog input signal, and a subtractor that generates a difference signal representing the difference between the aforementioned first sum signal and the aforementioned second sum signal; and the aforementioned difference signal is input to the aforementioned sample-and-hold circuit.

The signal regenerator of an aspect of the present invention has a first analog processing circuit that applies analog signal processing upon receiving the input of multiple analog signals obtained through photoelectric conversion of reflected light, a second analog processing circuit that applies analog processing upon receiving the input of the aforementioned multiple analog signals, a sampling pulse generation circuit that generates first and second sampling pulses upon receiving the input of the aforementioned multiple analog signals, a first sample-and-hold circuit that samples a signal output from the aforementioned first analog processing circuit in response to the aforementioned first sampling pulse, a second sample-and-hold circuit that samples a signal output from the aforementioned second analog processing circuit in response to the aforementioned second sampling pulse, and a multiplexer that outputs signals output from the aforementioned first and second sample-and-hold circuits selectively, wherein the aforementioned sampling pulse generation circuit includes a binarization circuit that converts the aforementioned multiple analog signals into respective pulse signals and a logic operation circuit that generates the aforementioned first and second sampling pulses by applying a logic operation to the aforementioned multiple pulse signals.

REFERENCE NUMERALS AND SYMBOLS AS SHOWN IN THE DRAWINGS

In the FIGS. 2A-2D, 4A, 4B represent a GCA circuit, 3A, 3B, 5, 7 represent an OP amplifier, 6, 151, 154 represent a sample-and-hold (S/H) circuit, 7 represents a BPF (band-pass filter), 8 represents an AGC (automatic gain control) circuit, 9, 10 represent a sampling timing control circuit, 11 represents a bottom detection circuit, 12 represents an A/D converter, 20 represents a disc, 30 represents a motor drive control part, 31 represents a spindle motor, 32 represents a thread motor, 41 represents a lens (Lens), 42 represents a monitoring circuit, 43 represents a laser diode, 44 represents a laser diode driver circuit, 45 represents a PDIC (photodetection IC), 46 represents a focus & tracking actuator, 50-1, 50-2 represent a flexible cable, 51A-51D represent a HPF (high-pass filter), 52A-52D, 156 represent a binarization circuit, 53, 157 represent a logic operation circuit, 53-1, 53-3 represent a selector, 53-2 represents an AND circuit, 53-4 represents a NOR circuit, 60 represents an analog front end (AFE), 62 represents an ATT.MUX (attenuator/multiplexer) circuit, 63 represents an RF-AGC circuit, 65 represents an equalizer, 70 represents a MUX S/H.GC (multiplexer sample-and-hold gain control amplifier) circuit, 71 represents a wobble GCA circuit, 72 represents a servo GCA circuit, 76 represents an OPC (optimum power control) circuit, 77 represents a focus circuit, 78 represents a tracking circuit, 90 represents a digital front end (DFE), 91 represents an RFADC, 92 represents a digital signal processing circuit, 93 represents a MPU.encoder, 94 represents a PC/IF, 95 represents a wobble ADC, 96 represents a buffer, 98 represents a servo ADC, 97 represents a write strategy, 100 represents an optical disc device, 110 represents a memory, 120 represents a computer, 130 represents a motor driver circuit, 150, 153, 155 represent an analog processing circuit, 152 represents a multiplexer (MUX) circuit, and 200, 300 represent a signal regenerator.

DESCRIPTION OF THE EMBODIMENT(S)

In the case of the signal regenerator of the present invention, because the quality of the wobble signal is improved, the write position information detection capability and the write block precision can be improved, and the circuits provided in subsequent stages for A/D conversion, filtering processing, and demodulation processing can be simplified. In addition, the number of pins can be reduced when creating an IC; and because the noise/unwanted radiation can be reduced, the timing for each disc rotation velocity and each system can be simplified.

Figure 1:
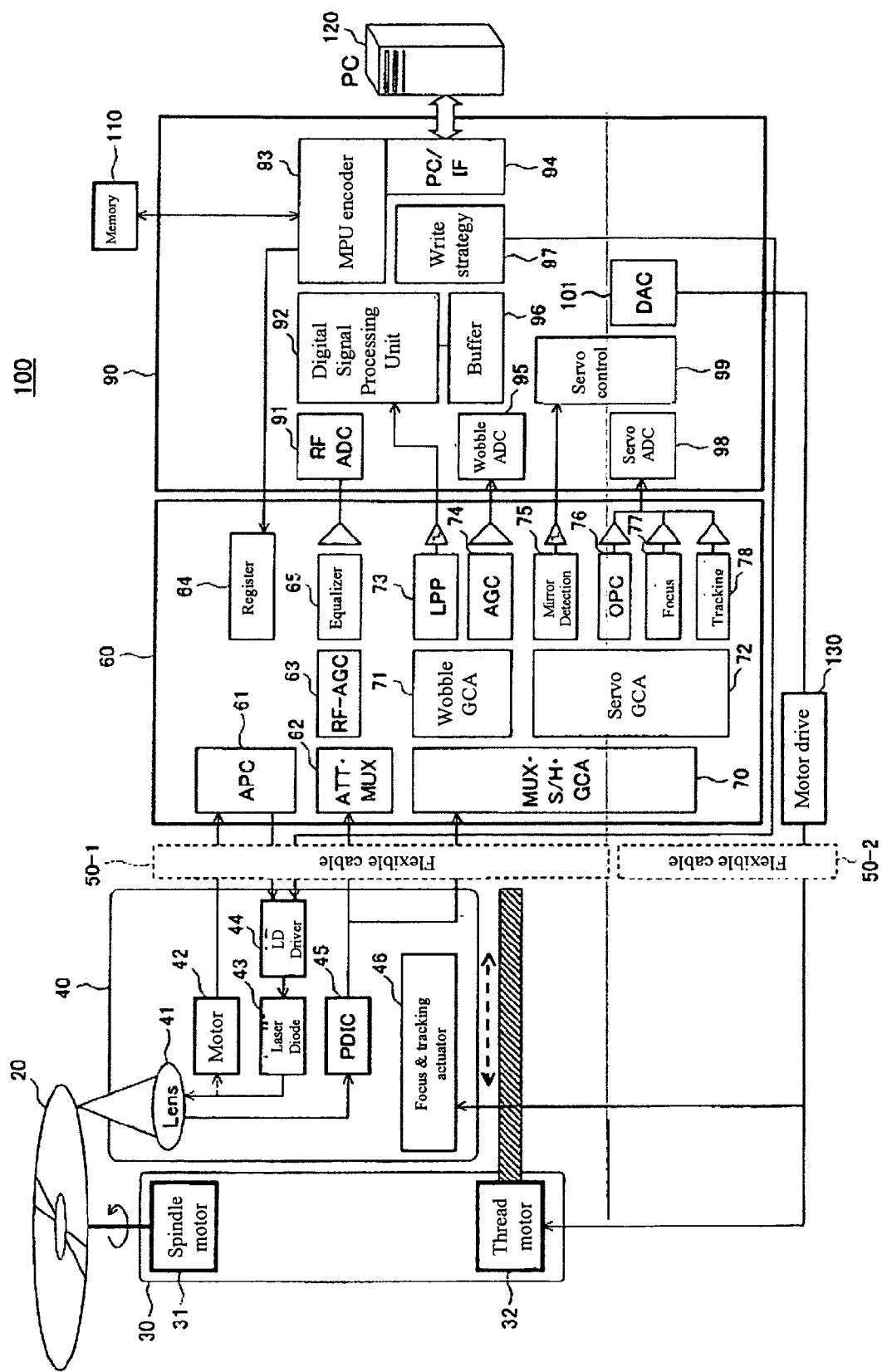
FIG. 1 is a diagram showing the block configuration of an optical disc device.

The block configuration of optical disc device 100 of the present invention is shown in FIG. 1. Optical disc device 100 shown in FIG. 1 is configured with motor drive control part 30 for controlling the rotation of disc 20, optical pickup unit 40, analog front end (AFE) 60, digital front end (DFE) 90, memory 110, computer (PC) 120, and so forth.

Motor drive control part 30 is configured with spindle motor 31 for disc rotation control and thread motor 32 for controlling the position of optical pickup unit 40.

Optical pickup unit 40 is configured with lens 41, monitoring circuit 42, laser diode 43, laser diode driver circuit 44, PDIC (photodetector IC: Photo Detector IC) 45, and focus & tracking actuator 46. Outputs of optical pickup unit 40 are input to inputs of analog front end (AFE) 60 via flexible cable 50-1. A tetrameric photodetector, for example, is used as PDIC 45 for obtaining electric signals from a reflected light; and signals A, B, C, and D as 4 output signals of this photodetector are output from PDIC 45. In addition, PDIC 45 outputs sum signal A+B+C+D of the 4 signals as an RF signal.

Analog front end 60 includes an RF signal processing circuit that is configured with APC (Automatic Power Control) 61, attenuator/multiplexer (ATT MUX) circuit 62, RF-AGC circuit 63, register 64, and equalizer 65, and a control signal processing circuit that is configured with MUX S/H GCA circuit 70, wobble GCA circuit 71, AGC circuit 74, servo GCA circuit 72, focus circuit 77, and tracking circuit 78.

Digital front end (DFE) 90 includes an RF signal processing circuit that is configured with RFADC (RF analog digital converter) 91, digital signal processing circuit 92 that carries out the processing of demodulation.ECC (error correction circuit), and buffer 96; a wobble signal processing circuit that is configured with wobble ADC 95 and a demodulation.ECC; a servo signal processing circuit that is configured with servo 98, servo control circuit 99, and DAC (digital analog converter) 101; MPU-encoder 93; write strategy 97 for laser modulation; and PC/IF (computer/interface) 94.

In addition, optical disc device 100 is equipped with memory 110, computer (PC) 120, and motor driver circuit 130, and so forth.

A meandering groove is formed on disc 20 based on absolute time information, whereby information of various kinds is recorded along said groove, and information written there is read. At this time, disc 20 is spun by spindle motor 31 at a constant linear velocity (CLV: Constant Linear Velocity) or a constant angular velocity (CAV: Constant Angular Velocity) while the tracking and the focus are adjusted.

Optical pickup unit 40 is provided so as to face disc 20 in order to record/regenerate information to/from disc 20, and laser diode 43 and PDIC 45 are provided therein. During the recording of information, a light output from laser diode 43 is emitted to disc 20 via lens 41 in order to write the information. During the regeneration of the information, the information recorded on disc 20 is input to PDIC (photodetector IC) 45 in the form of reflected light. Then, 4 signals A-D, for example, are generated by the tetrameric photodetector, and said signals A-D and an RF signal obtained by summing them are output. Information on video (image) and audio signals are extracted from said RF signal; and control signals such as a wobble signal, a focus signal, and a tracking signal, are generated from said RF signal by using signals A-D. Also, at the time of the recording of information, a wobble signal, a focus signal, and a tracking signal are generated based on 4 signals A-D from the tetrameric photodetector. In addition, the configuration may be as such that an octameric type or a spectroscopic (hologram) type is utilized as the photodetector instead of the tetrameric type in order to input 4 signals A-D.

The RF signal output from PDIC 45 is supplied to RF-AGC circuit 63 via ATT.MUX circuit 62 in order to attain a constant signal level. Subsequently, after its high-frequency band frequencies are emphasized by equalizer 65, it is supplied to RFADC 91, and the analog RF signal is converted into a digital signal there. Subsequently, digital signal processing circuit 92 carries out demodulation, decoding, and ECC (error correction) demodulation pertaining to MPEG (Motion Picture Experts Group) 2.

On the other hand, the output signal amplitude of a servo signal, which is generated based on signals A-D output from PDIC 45, is regulated by GCA circuit 72. In addition, signals for mirror detection and defect detection, OPC (Optimum Power Control), focus, and tracking are also generated, output to servo ADC 98, and converted into digital signals. Said signals are processed by servo control (servo control) circuit 99, processed into analog signals by DAC 101, and supplied to motor driver circuit 130. A control signal output from motor driver circuit 130 is output to focus & tracking actuator 46 via flexible cable 50-2. As a result, optical pickup unit 40 is controlled in order to adjust the focus and the tracking.

Signals A-D from PDIC 45 are supplied to MUX-S/H-GCA circuit 70, and binary signals are generated from the respective analog signals. Logic operations are applied to said binary signals in order to generate sampling pulses for S/H. After a raw wobble signal that is generated based on signals A-D is sampled using said generated sampling pulses, held at a prescribed timing, and turned into an accurate wobble signal, AGC processing is applied and converts it into a digital wobble signal at ADC 95 through digital signal processing.

During a write operation, audio signals and video signals input to MPU-encoder 93 are encoded into digital signals with information compressed using Dolby AC3 or MPEG2, formed into a packet, and then encrypted. Modulation is applied to the encrypted digital signals, which involves recording compensation by means of a multi-pulse modulation method, at write strategy 97 used for modulation of laser diode 43, before they are supplied to laser diode 43. Then, the information is written to disc 20 based on ON/OFF of said modulated pulses.

As described above, the wobble detection circuit of optical disc device 100 shown in FIG. 1 generates sampling pulses from multiple signals input from PDIC 45 and extracts an accurate wobble signal at the S/H circuit using said sampling pulses. Thus, the supply for any sampling pulses for controlling the S/H circuit to MUX.S/H.GCA circuit 70 from digital front end 90 using IC pins or wires is not required.

Because the sampling pulses for controlling the S/H circuit can be generated within analog front end 60, optical disc device 100 of the present invention is advantageous not only in that the number of pins required when formed into an IC does not increase, but also in that the problem of noise/radiation from the IC pins and of the wires attributable to the sampling clock does not exist. In addition, adjustment of the disc rotation velocity and of the timing for each system can be simplified. When the quality of the wobble signal is improved, the write position information detection capability and the write clock precision can be improved, and circuits for subsequent processing, such as A/D conversion, filtering, and demodulation can be simplified.

In addition, when logic operations (AND, OR) of the input signals (signals A-D) are combined appropriately, they can be used in a wide range of applications; for example, not only in sampling while marks are being formed, but also in generation of sample control signals when at the spaces, generation of servo and R-OPC (Optimum Power Control) signals, and as signals for gain offset signal switching.

Next, detailed circuits of MUX.S/H.GCA (Gain Control Amplifier circuit 70, wobble GCA Circuit 7 and AGC Circuit 74 in analog front end 60 of optical disc device 100 in FIG. 1 will be explained.

Figure 2:
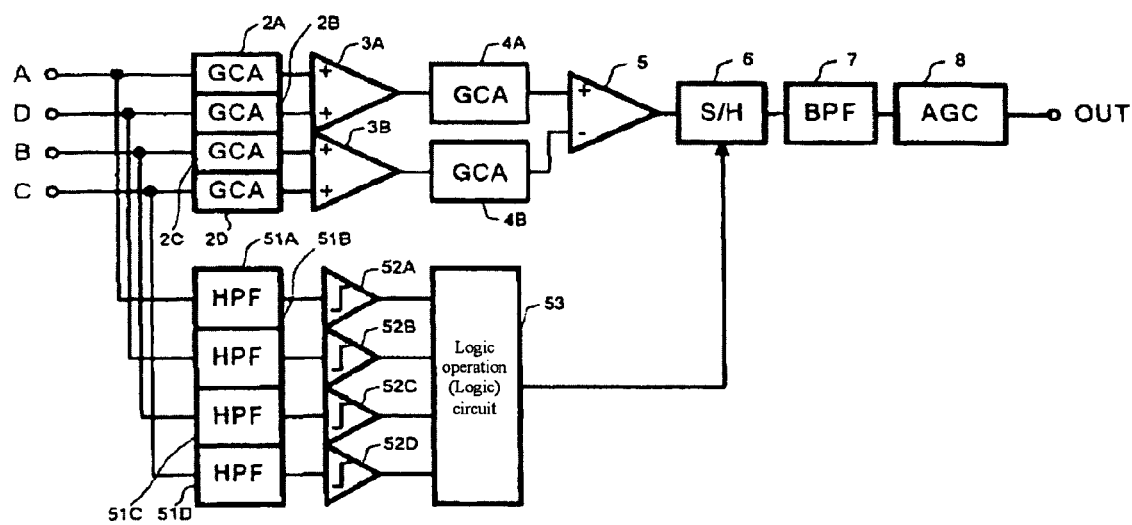
FIG. 2 is a block diagram of a signal regenerator.

The circuit configuration of signal regenerator 200 for regenerating a wobble signal is shown in FIG. 2. At signal regenerator 200, 4 signals A-D output from PDIC 45 are supplied to GCA circuits 2A-2D, respectively. In addition, said signals A-D are also supplied to HPFs (High-Pass Filter: high-pass filter) 51A-51D.

The outputs of GCA circuit 2A and GCA circuit 2B are connected to the inputs of OP amplifier (adder) 3A, and its output is connected to the input of GCA circuit 4A. The outputs of GCA circuit 2C and GCA circuit 2D are connected to inputs of OP amplifier (adder) 3B, and its output is connected to the input of GCA circuit 4B. The output of GCA circuit 4A is connected to the non-inverting input terminal of OP amplifier 5, and the output of GCA circuit 4B is connected to inverting input terminal of OP amplifier 5.

On the other hand, the output of HPF 51A is connected to the input of binarization circuit 52A, and the output of binarization circuit 52A is connected to a first input terminal of logic operation circuit (Logic) 53. The output of HPF 51B is connected to the input of binarization circuit 52B, and the output of binarization circuit 52B is connected to a second input terminal of logic operation circuit (Logic) 53. The output of HPF 51C is connected to the input of binarization circuit 52C, and the output of binarization circuit 52C is connected to a third input terminal of logic operation circuit (Logic) 53. The output of HPF 51D is connected to the input of binarization circuit 52D, and the output of binarization circuit 52D is connected to a fourth input terminal of logic operation circuit (Logic) 53. The output of logic operation circuit 53 is connected to the control terminal of S/H circuit 6.

The output of OP amplifier 5 is connected to the input of S/H circuit 6, and the output of said S/H circuit 6 is connected to the input of BPF (Band Pass Filter: band-pass filter) 7. The output of BPF 7 is connected to the input of AGC circuit 8, and the output of AGC circuit 8 is connected to terminal OUT.

Next, operations of signal regenerator 200 for detecting a wobble signal will be explained.

A laser beam hits disc 20, and the resulting reflected light enters the 4 light-receiving elements of the tetrameric photodetector, and I-V (current-voltage) converted analog signals (voltage signals) A-D are supplied to the respective input terminals of GCA circuits 2A-2D from there.

During a recording operation, marks are formed on the disc by the recording light power, and unrecorded parts are left as spaces. Signals A-D to be input to GCA circuits 2A-2D include recording signal elements (Write RF signals) and wobble signal elements, and wobble elements with a relatively high C/N (Carrier/Noise ratio) are obtained from the reflected light generated by the light power.

The light-receiving elements are configured in such a manner that they match sets (A+D) and (B+C), whereby a wobble signal can be obtained based on the difference between sets (A+D) and (B+C). However, in signals A-D, because the input amplitudes may vary depending on the light paths and the sensitivities of the respective light-receiving elements, the levels of the input signals need to be matched.

The aforementioned tetrameric photodetector and one on which 6 PiN-structured diodes are arranged on a plane at regular intervals, for example, may be mentioned as the light-receiving elements, not shown, for generating signals A-D. Said light-receiving elements generate electrons so as to generate corresponding currents according to the light that enters therein. Said currents are dependent on the intensities and the wavelengths of the light as well as on the semiconductor process and structure.

At GCA circuit 2A-GCA circuit 2D, gains are regulated so as to regulate the amplitudes of the light signals (currents or voltages) in order to adjust the amplitudes coarsely. OP amplifier 3A adds up the signals supplied from GCA circuit 2A and GCA circuit 2B and outputs the (A+D) signal to GCA circuit 4A. In addition, OP amplifier 3B adds up the signals supplied from GCA circuit 2C and GCA circuit 2D and outputs the (B+C) signal to GCA circuit 4B.

At OP amplifier 5, the (A+D) signal supplied from GCA circuit 4A is input to the non-inverting input terminal, the (B+C) signal input from GCA circuit 4B is supplied to the inverting input terminal, subtraction processing is applied to the signals, and an (A+D)−(B+C) signal is output from the output terminal. That is, after (A+D) and (B+C) are computed at respective OP amplifiers 3A and 3B, fine gain adjustments are made at GCA circuits 4A and 4B in order to optimize the gain balance before the wobble elements are extracted at OP amplifier 5.

S/H circuit 6 samples and holds a wobble signal extracted at the time of the formation of a mark. Upon receiving the input of a signal output from S/H circuit, BPF 7 allows the passage of only the frequency element required as the wobble signal. AGC circuit 8 applies automatic gain control to the output signal from BPF 7 in order to output a signal with a fixed amplitude.

Next, operations for generating sampling pulses to be supplied to the control terminal of S/H circuit 6 will be explained with reference to FIG. 2 and FIG. 3. This circuit for generating the sampling pulses is configured with HPFs 51A-51D, binarization circuits 52A-52D, and logic operation circuit 53.

Figure 3:
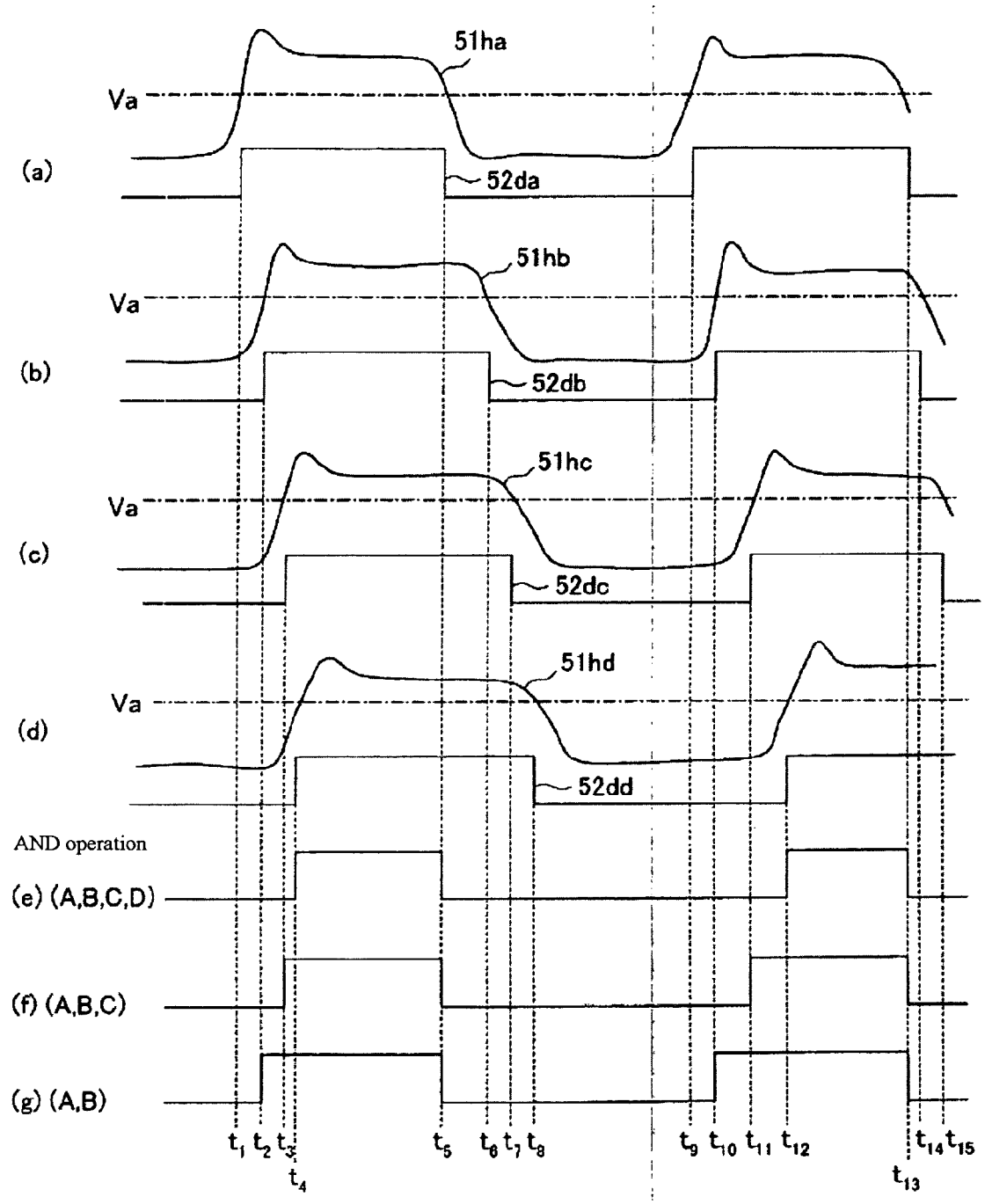
FIG. 3 is waveform diagrams for explaining operations of the signal regenerator.

Signals (waveforms) 51*ha*, 51*hb*, 51*hc*, and 51*hd* output from HPFs 51A-51D are shown in FIG. 3. The signals output from said HPFs 51A-51D are supplied to binarization circuits 52A-52D that are provided in the next stage.

HPFs 51A-51D are used to remove signals and noise from the low-frequency band and output signals with high-frequency elements, for example. When signals 51*ha*, 51*hb*, 51*hc*, and 51*hd* are higher than threshold value Va (voltage), the outputs of binarization circuits 52A-52D become "H" (high) level. For example, at binarization circuit 52A, because input signal 51*ha* is lower than Va until time t1, its output is at the "L" level, and since it exceeds Va between time t1 and time t5, it transitions from the "L" level to the "H" level at time t1 (circuit diagram 3(*a*)), and it remains at the "H" level until time t5. Because signal 51*ha* falls below Va when time t5 is reached, the output changes from the "H" level to the "L" level. This state continues until time t9, signal 51*ha* rises above threshold value Va at time t9, the output changes from the "L" level to the "H" level, and signal 52*ha* falls below Va when time t13 is reached, so a transition is made from the "H" level to the "L" level. As a result, signal 52*da* output from binarization circuit 52A takes the waveform shown in FIG. 3(*a*).

In addition, at binarization circuit 52B, because signal 51*hb* is lower than Va until time t2, the output level is "L", and since it exceeds Va between time t2 and time t6, a transition is made from the "L" level to the "H" level at time t2 (circuit diagram 3(*b*)), and the "H" level is maintained until time t6. Because signal 51*hb* falls below threshold value Va when time t6 is reached, the output level changes from "H" to "L". This "L" level state continues until time t10, signal 51*hb* rises above threshold value Va at time t10, and the output level changes from "L" to "H". As a result, signal 52*db* output from binarization circuit 52B takes the waveform shown in FIG. 3(*b*).

Similarly, assuming that the threshold value is Va, the output level of binarization circuit 52C is "H" from time t3 to time t7, "L" from time t7 to time t11, and "H" from time t11 to time t15 (FIG. 3(*c*)). As a result, signal 52*dc* output from binarization circuit 52C takes the waveform shown in FIG. 3(*c*).

Assuming that the threshold value is Va, the output level of binarization circuit 52D is "H" from time t4 to time t8, "L" from time t8 to time t12, and "H" from time t12 (to time t16) (FIG. 3(*d*)). As a result, signal 52*dd* output from binarization circuit 52D takes the waveform shown in FIG. 3(*d*).

Next, the binarized signals output from binarization circuits 52A-52D are supplied to logic operation circuit 53 and arithmetic processing is applied there.

Here, there is no need to restrict the number of signals 52*da*-52*dd* to be input to logic operation circuit 53, and a signal to be input may also be combined arbitrarily. An explanation is given below using a specific example.

First, operations to be carried out when logic operation circuit 53 is configured with an AND (circuit) will be explained.

First, the AND logic operation to be carried out when 4 input signals are involved will be explained. In this case, the 4 input signals are 52*da*, 52*db*, 52*dc*, and 52*dd*.

Signal (waveform) 52*da* output from binarization circuit 52A is at the "H" level during periods t1-t5 and t9-t13. Signal (waveform) 52*db* output from binarization circuit 52B is at the "H" level during periods t2-t6 and t10-t14. Signal (waveform) 52*dc* output from binarization circuit 52C is at the "H" level during periods t3-t7 and t11-t15. In addition, signal (waveform) 52*dd* output from binarization circuit 52D is at the "H" level during periods t4-t8 and t12-t16. As a result, the output of the AND circuit becomes "H" level during the "H" level periods common to said signals, which are periods t4-t5 and t12-t13 (FIG. 3(*e*)).

Next, the AND logic operation to be carried out when 3 input signals are involved will be explained. Here, an example in which signals 52*da*, 52*db*, and 52*dc* as the 3 inputs are combined will be shown.

Signal 52*da* output from binarization circuit 52A is at the "H" level during periods t1-t5 and t9-t13. Signal 52*db* output from binarization circuit 52B is at the "H" level during periods t2-t6 and t10-t14. Signal 52*dc* output from binarization circuit 52C is at the "H" level during periods t3-t7 and t11-t15. As a result, common "H" level periods of t3-t5 and t11-t13 are obtained through AND operation of these signals (FIG. 3(*f*)).

When 3 input signals 52*da*, 52*db*, and 52*dc* are combined, the results of the AND logic operation indicate longer pulse durations than those indicated by the operational results of 4 signals 52*da*-52*dd*. Although 52*da*, 52*db*, and 52*dc* were used as the 3 (input) signals in the aforementioned example, said combination does not impose a restriction; and combination of signals 52*da*, 52*dc*, and 52*dd*; combination of signals 52*db*, 52*dc*, and 52*dd*; or combination of signals 52*da*, 52*db*, and 52*dd* may be used.

Next, the AND logic operation to be carried out when 2 input signals are involved will be explained. Here, an example in which signals 52*da* and 52*db* as the 2 inputs are combined will be shown.

Signal 52*da* output from binarization circuit 52A is at the "H" level during periods t1-t5 and t9-t13. Signal 52*db* output from binarization circuit 52B is at the "H" level during periods t2-t6 and t10-t14.

As such, the AND logic operation of these signals results in the common "H" level periods of t2-t5 and t10-t13 (FIG. 3(*g*)).

When 2 signals 52*da* and 52*db* are combined, the results of the AND logic operation indicate even longer pulse durations than those indicated by the operational results of 3 signals 52*da*-52*dc*.

Although 52*da* and 52*db* were used as the 2 (input) signals in the aforementioned example, said combination does not impose a restriction; and such combinations as signals 52*da* and 52*dc*, 52*da* and 52*dd*, 52*db* and 52*dc*, 52*db* and 52*dd*, or 52*dc* and 52*dd* may also be used.

Next, the logic operation to be carried out when 1 input signal is involved will be explained. Here, an example in which signal 52*da* is used as the 1 input signal will be shown.

Signal 52*da* output from binarization circuit 52A is at the "H" level during periods t1-t5 and t9-t13 (FIG. 3(*a*)). The result of the logic operation involving only signal 52*da* indicates even longer pulse durations than those indicated by the operational results of 2 input signals 52*da*-52*db*. Although signal 52*da* was used as the 1 input signal in the aforementioned example, it does not impose any restriction; and signal 52*db*, 52*dc*, or 52*dd* may also be selected.

As described above, it is also feasible for an arbitrary number of input signals to be selected from multiple input signals, and for AND processing to be applied to them in order to generate sampling pulses to be supplied to S/H circuit 6, for example. In addition, the pulse widths of the sampling pulses can be regulated by regulating the number of input signals and their combinations.

Figure 4:
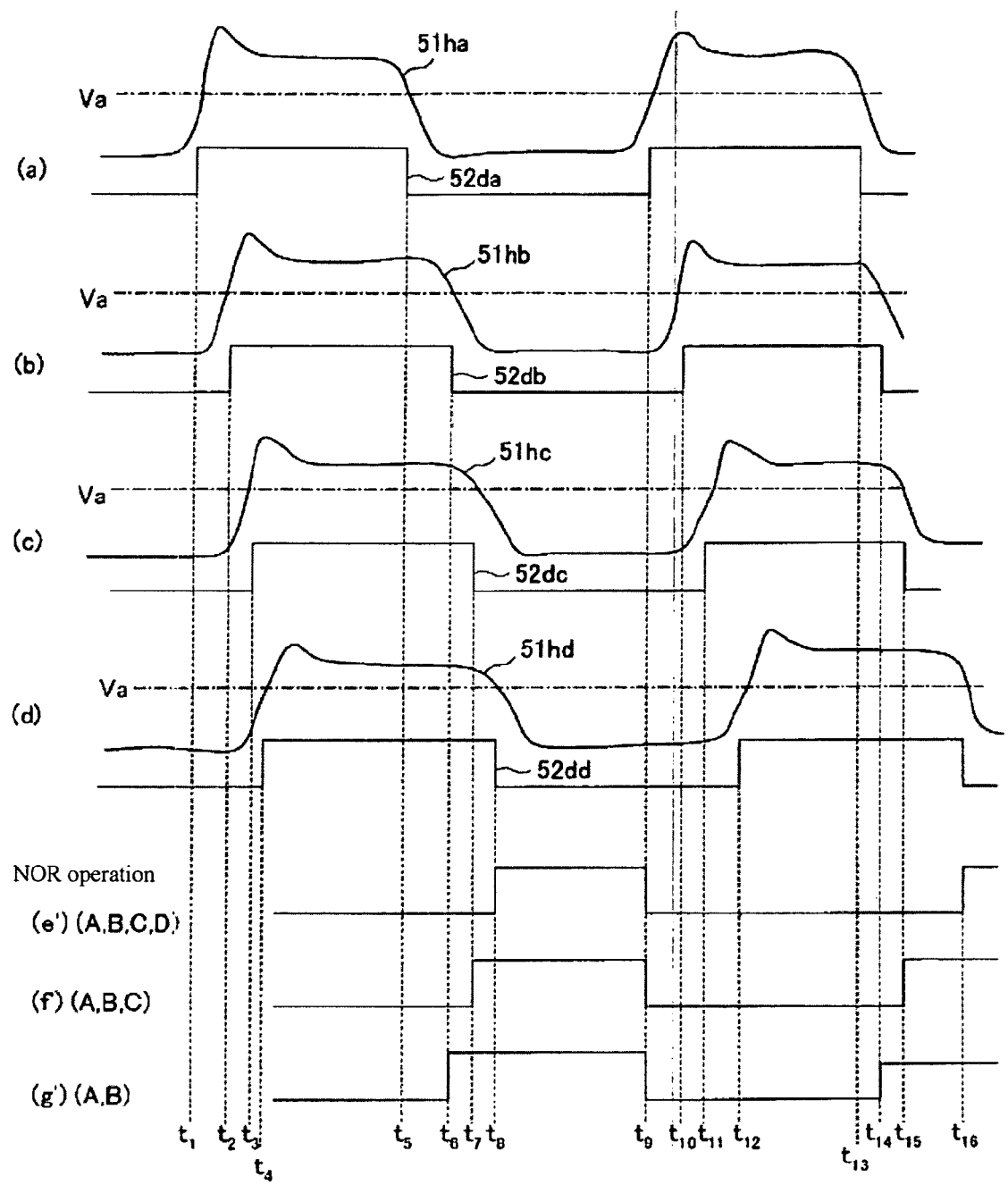
FIG. 4 is waveform diagrams for explaining operations of the signal regenerator.

Next, a modification example of logic operation circuit 53 as another embodiment will be shown. FIG. 4 shows an operation example when using a NOR circuit for logic operation circuit 53. In this case, too, as in the AND logic operation, 4, 3, 2, or 1 signal may be selected arbitrarily from among 52*da*-52*dd*. Here, the waveforms output from respective HPFs 51A-51D and binarization circuits 52A-52D are assigned with the same symbols as those shown in FIG. 3.

First, a case in which 4 signals 52*da*-52*dd* are input will be described.

Signal 52*da* output from binarization circuit 52A is at the "L" level during periods t5-t9 and t13 (–). Signal 52*db* output from binarization circuit 52B is at the "L" level during periods t6-t10 and t14 (–). Signal 52*dc* output from binarization circuit 52C is at the "L" level during periods t7-t11 and t15 (–). Signal 52*dd* output from binarization circuit 52D is at the "L" level during periods t8-t12 and t16 (–). As such, "H" level signals are output during periods t8-t9 and t16 (–) as a result of the logic operation of the NOR circuit (FIG. 4(*e'*)).

The NOR logic operation to be carried out when 3 inputs are involved will be explained. Here, an example in which signals 52*da*, 52*db*, and 52*dc* are combined as 3 inputs will be shown.

Signal 52*da* output from binarization circuit 52A is at the "L" level during periods t5-t9 and t13 (–). Signal 52*db* output from binarization circuit 52B is at the "L" level during periods t6-t10 and t14 (–). Signal 52*dc* output from binarization circuit 52C is at the "L" level during periods t7-t11 and t15 (–). As such, "H" level signals are output during periods t7-t9 and t15 (–) as a result of the logic operation of the NOR circuit (FIG. 4(*f*)).

As described above, when 3 signals 52*da*, 52*db*, and 52*dc* are combined, the results of the NOR logic operation indicate longer pulse durations than those indicated by the operational results of 4 (input) signals 52*da*-52*dd*. In addition, although 52*da*, 52*db*, and 52*dc* were used as the 3 input signals in the aforementioned example, said selection does not impose a restriction, and the pulse signals may also be generated using different combinations.

Next, the NOR operation to be carried out when 2 inputs are involved will be explained. Here, a case in which signals 52*da* and 52*db* as 2 input signals are combined will be shown.

Signal 52*da* output from binarization circuit 52A is at the "L" level during periods t5-t9 and t13 (–). Signal 52*db* output from binarization circuit 52B is at the "L" level during periods t6-t10 and t14 (–). As such, "H" level signals are output during periods t6-t9 and t14 (–) as a result of the logic operation of the NOR circuit (FIG. 4(*g'*)). Although 52*da* and 52*db* were used as the 2 input signals in the aforementioned example, said selection does not impose a restriction, and the pulse signals may also be generated using different combinations.

As described above, the control signals, for example, the sampling pulses to be supplied to S/H circuit 6, can be generated by selecting at least 2 signals from among the multiple input signals and applying NOR processing to the selected signals. In addition, the pulse widths of the sampling pulses can be regulated through selection of the number of binary signals to be input. In addition, it is also feasible for 1 input signal to be selected from among the multiple input signals, and for the NOR operation to be applied to it in order to generate the sampling pulse.

The aforementioned output pulses (sampling pulses) output from the AND circuit are used by S/H circuit 6 to sample-and-hold the wobble signals extracted at the time of the formation of the marks in order to obtain a more accurate wobble signal.

Figure 5:
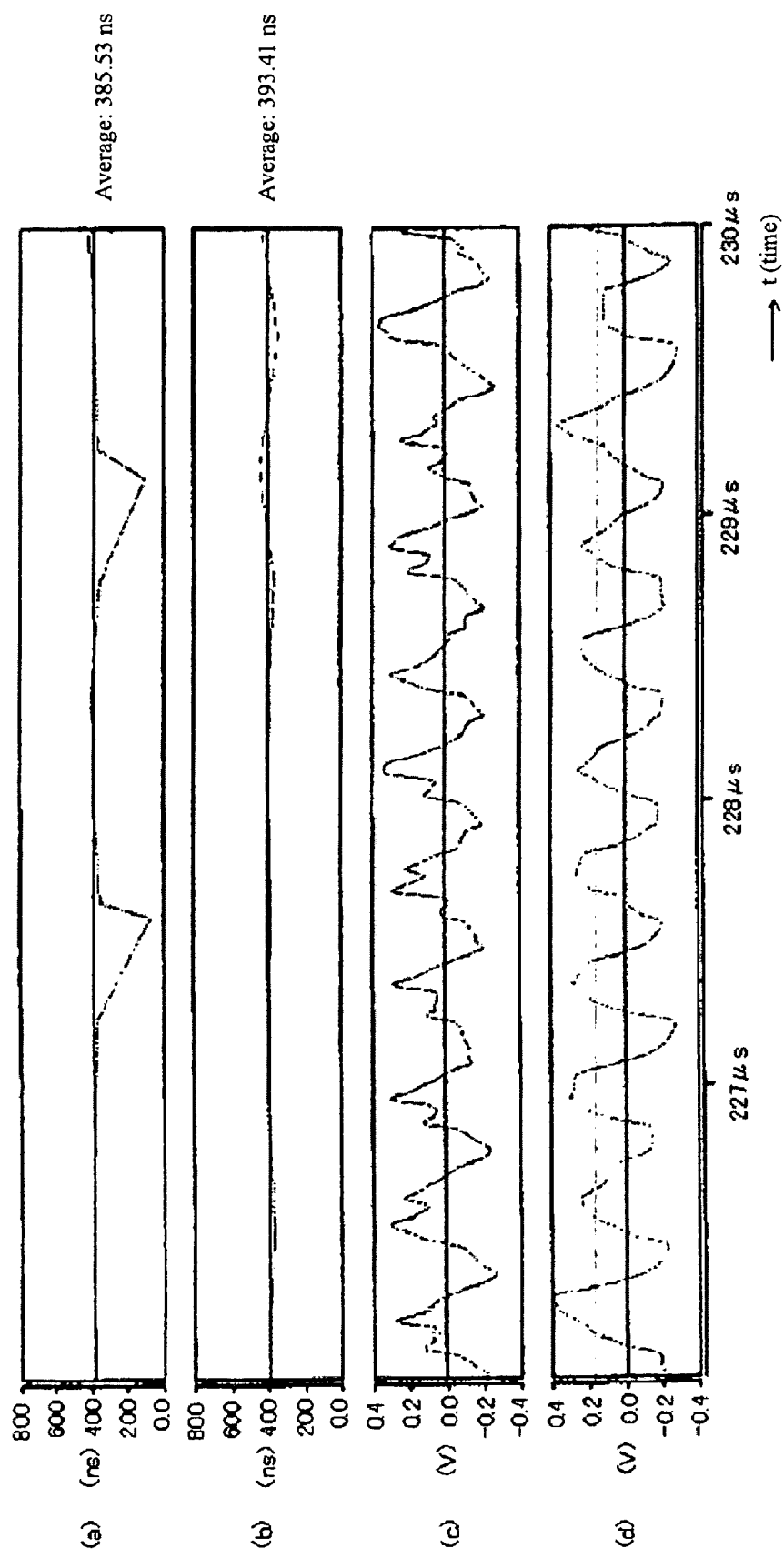
FIG. 5 is diagrams showing the results of measurement by the signal regenerator.

Next, wobble signal measurement results obtained using the aforementioned combination averaging sampling methods are shown in FIG. 5.

FIG. 5(*c*) shows the measurement result of the averaging method, and FIG. 5(*d*) shows the wobble output result of the combination timing method of the present invention. In addition, FIG. 5(*a*) shows the cycle time result corresponding to FIG. 5(*c*), and FIG. 5(*b*) shows the cycle time result corresponding to FIG. 5(*d*).

The waveform of the wobble signal obtained using the averaging method shown in FIG. 5(*c*) contains distortions. In particular, the waveform of the wobble signal oscillates in the vertical direction relative to 0.0 V near time 227 μs or at time 229 μs, whereby the apparent cycle is shortened. The cycle time in FIG. 5(*a*) is reduced rapidly in response to said apparent short cycle.

In contrast, as shown in FIG. 5(*d*), the wobble signal obtained using the combination method of the present invention contains little distortion, and the signal cycle accordingly fluctuates little. As a result, as shown in FIG. 5(*b*), fluctuation in the cycle time becomes less than that of the averaging method.

This result indicates that when the present method is used, a waveform closer to the raw wobble signal than that obtained using the averaging method is output, so that the quality of the wobble signal can be improved without an S/H control signal from the write pulse generation block.

Figure 6:
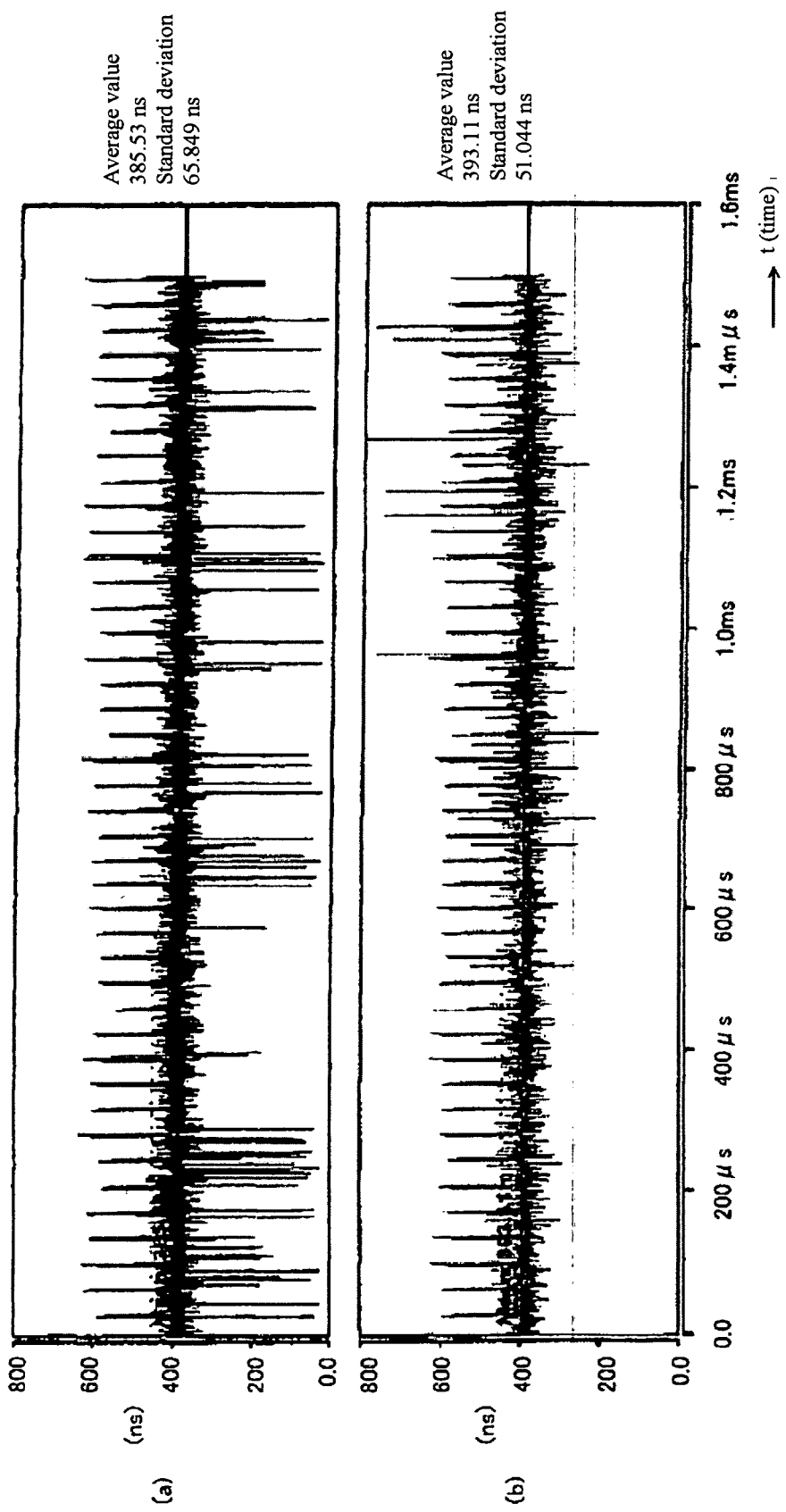
FIG. 6 is diagrams showing the results of measurement by the signal regenerator.

In addition, the results regarding the cycle time that are obtained over a wide range (long time) are shown in FIG. 6. In FIG. 6(*a*) and (*b*), cycle time peaks are observed periodically. The reason is that the carrier cycle of the wobble signal is close to roughly 390 ns (nanoseconds), and PSK (Phase Shift keying) modulation is also carried out for burying address information. The cycle time at said phase inverting part is 600 ns or so.

Figures 7, 8:
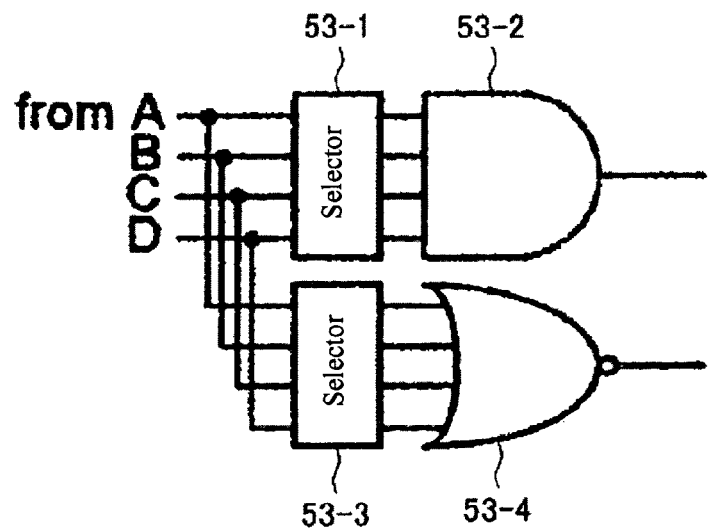
FIG. 7 is diagrams showing a comparison of measurement results between the signal regenerator and a conventional example.
FIG. 8 is a diagram showing an example circuit configuration of a logic operation circuit.

A comparison of the results in FIG. 6(*a*) and FIG. 6(*b*) regarding the carrier cycle results indicates that standard deviation, including wobble modulation elements, was improved by 22.5% or so with the combination sampling method as compared to the averaging method, whereby the cycle time could be stabilized (Refer to FIG. 7).

Next, a specific circuit configuration example of logic operation circuit 53 will be shown. As shown in FIG. 8, logic operation circuit 53 includes a configuration comprising selector 53-1 and AND circuit 53-2 and a configuration comprising selector 53-3 and NOR circuit 53-4. Selectors 53-1 and 53-2 are circuits for selecting signals A-D, and they can be controlled using a microprocessor (MPU), for example, in order to allow an arbitrary number and an arbitrary combination of signals to be selected.

Figure 9:
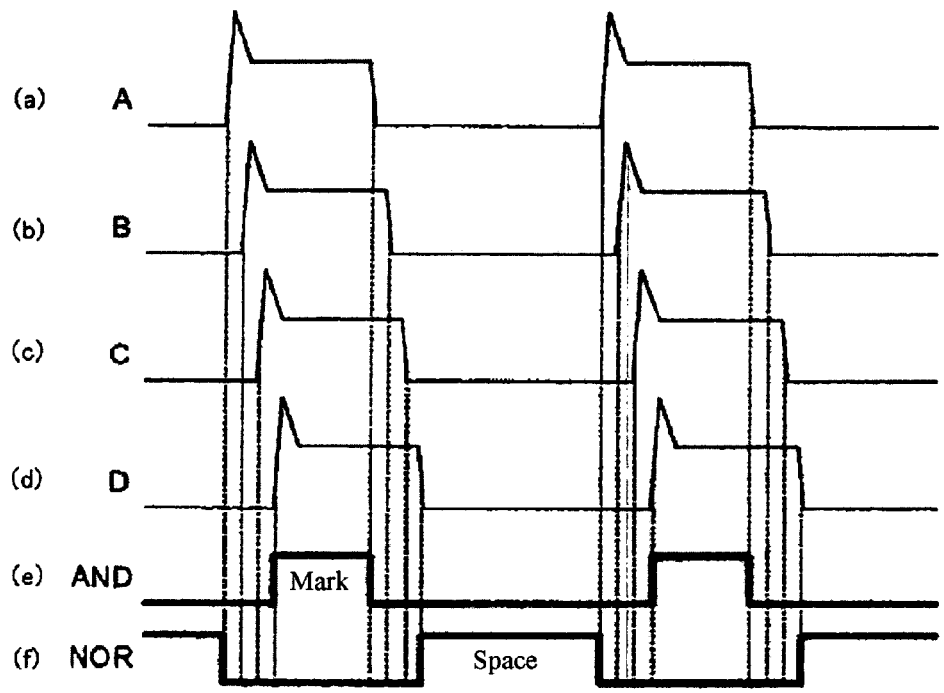
FIG. 9 is waveform diagrams for explaining operations of the logic operation circuit.

Respective signals output from HPAs 51A-51D are supplied to selector 53-1. Here, selectors 53-1 and 53-3 are switched independently or simultaneously by a control means not shown; and 4, 3, 2, or 1 input signal is selected arbitrarily among input signals A, B, C, and D in the manner described above. The signals selected by selector 53-1 are input to AND circuit 53-2. For example, when signals A, B, C, and D are selected by selector 53-1, the waveform mark shown in FIG. 9(*e*) is output from AND circuit 53-2.

Similarly, 4 signals A, B, C, and D are input to selector 53-3; 4, 3, 2, or 1 is selected arbitrarily by the control means, not shown, and supplied to NOR circuit 53-4 that is provided in the next stage. For example, when 4 signals A, B, C, and D are selected by selector 53-3, for example, the waveform space shown in FIG. 9(*f*) is output. When logic operation circuit 53 is configured with a NOR circuit, use in controlling the sampling when forming a space is possible.

Here, a configuration that allows the sampling pulses to be supplied only from AND circuit 53-2 or NOR circuit 53-4 to S/H circuit 6 may be adopted. Also, when fixed signals are used for the logic operation without involving a signal selection, selectors 53-1 and 53-3 are no longer needed, and only the AND circuit or an OR circuit may be used. Furthermore, a configuration may be adopted in which pulses are output from AND circuit 53-2 and NOR circuit 53-4 so as to use them both for sampling, or in which one of them is used selectively.

Figure 10:
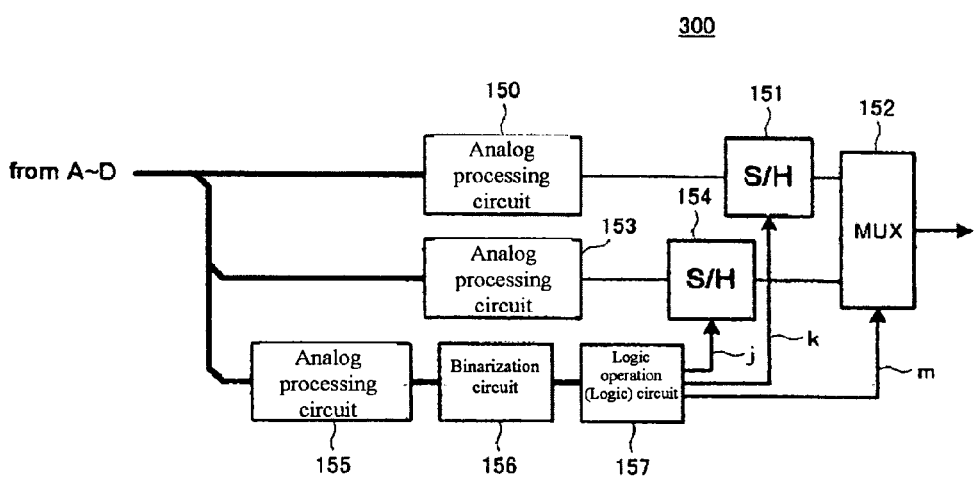
FIG. 10 is a block diagram showing the configuration of a signal switching circuit.

Signal regenerator 300 of another embodiment of the present invention is shown in FIG. 10. As shown in FIG. 10, signal regenerator 300 for multiplexing input signals is configured with analog processing circuits 150, 153, and 155, to which (input) signals A-D are supplied; S/H circuits 151 and 154; binarization circuit 156; logic operation (Logic) circuit 157; and MUX (multiplexer) circuit 152.

Analog processing circuits 150, 153, and 155 are configured with an amplifier, a GCA circuit, an AGC circuit, and so forth. S/H circuits 151 and 154 sample-and-hold input analog signals using sampling pulses supplied from logic operation circuit 157. A capacitor may be mentioned as a hold circuit. Multiplexer circuit 152 switches the hold signals supplied from S/H circuit 151 or S/H circuit 154 using a control signal (sampling pulse) supplied from logic operation circuit 157 in order to output a multiplexed signal. Here, binarization circuit 156 and logic operation circuit 157 may be configured using the circuit shown in FIG. 8, for example.

Figure 11:
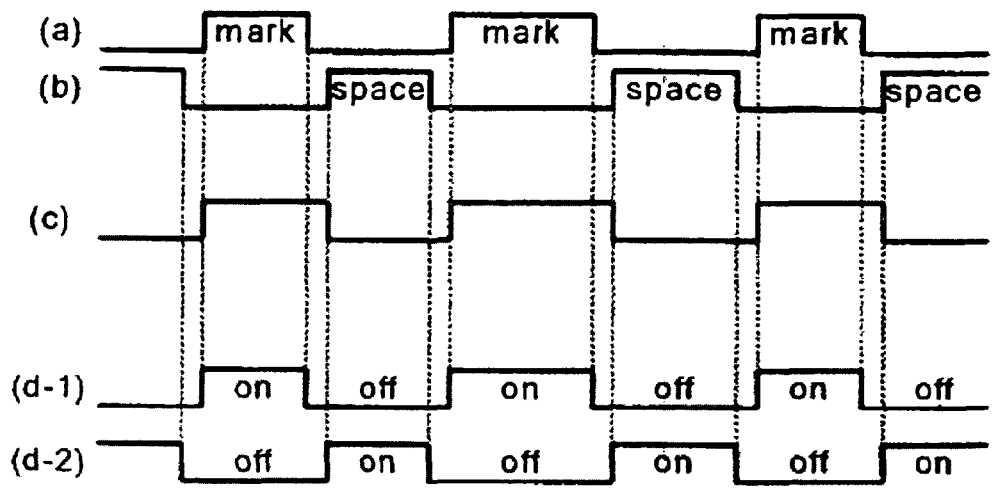
FIG. 11 is waveform diagrams for explaining operations of the signal switching circuit.
Figure 12:
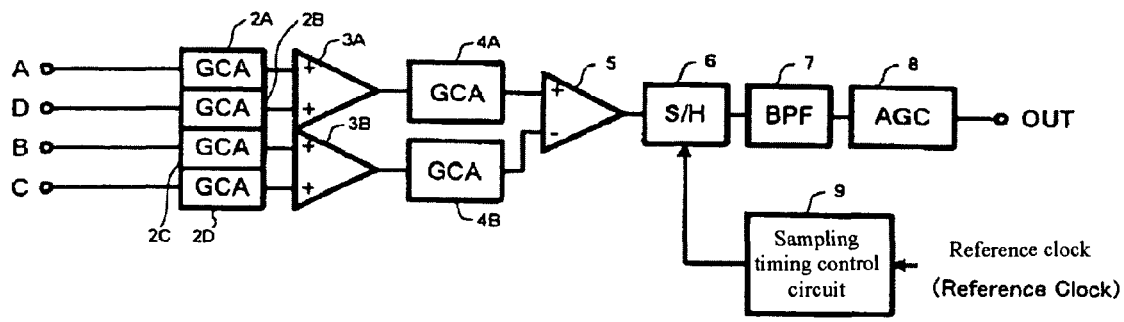
FIG. 12 is a block diagram showing the configuration of a conventional wobble signal detection circuit.
Figure 13:
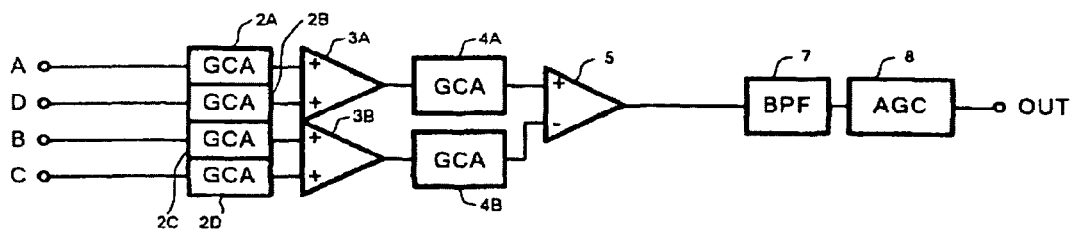
FIG. 13 is a block diagram showing the configuration of another conventional wobble signal detection circuit.

A signal supplied via analog processing circuit 155 is converted into a pulse signal at binarization circuit 156, a logic operation is carried out on said binarized pulse signal at logic operation circuit 157, and a control pulse is generated using an AND circuit and a NOR circuit, for example. An example of waveform mark (j) output to S/H circuit 154 from logic operation circuit 157 is shown in FIG. 11(*a*), and an example of waveform space (k) output to S/H circuit 151 is shown in FIG. 11(*b*).

In addition, the following control methods may be used to switch the multiplexer circuit. One example pertains to a method in which the signals are switched at the rise of aforementioned mark (j) signal and at the fall of the space (k) signal. In this case, MUX circuit 152 generates an output of the kind shown in FIG. 11(*c*). Another example pertains to a method in which the output from S/H circuit 151 is selected in the case of a mark in FIG. 11(*a*), and the output from S/H circuit 154 is selected in the case of a space in FIG. 11(*b*). These selection methods are shown in FIGS. 11(*d*-1) and (d-2).

According to this embodiment, switching control based on a combination of input signals can utilized in a wider range, for example, for generating sample control signals not only when forming marks but also when forming spaces, for generating servo and R-OPC signals, and as signals for switching other gain offset signals. Because the sampling pulse of S/H circuit 6 only has to match the timing for recording (writing) a mark or a space, the aforementioned sampling pulses may be generated using signals obtained directly from the laser beam through photoelectric conversion in addition to the aforementioned generation of the sampling pulses from reflected light signals A, B, C, and D. In addition, the sampling pulse width does not have to be the pulse signal width obtained as a result of a logic operation, and a pulse width as a result of a logic operation may be stretched as needed, or a one-shot pulse may be generated based on a result of said logic operation.

Furthermore, in FIG. 2, a configuration may be adopted in which an LPF and an amplifier may be inserted between OP amplifier 5 and S/H circuit 6 so as to provide a signal output from OP amplifier 5 with an appropriate delay in order to adjust the timing.

As described above, with the combination sampling method of the present invention, adjustments of a rotating velocity of an optical disc and the timing of each system can be made more easily without concern regarding an increase in the number of pins to be used and regarding noise/unwanted radiation as compared with a conventional sampling method.

Then, because the quality of the wobble signal is improved, the position information detection capability and the accuracy of the write clock can be improved, and the circuits for such subsequent processing as A/D conversion, filtering, and demodulation processing can also be simplified.

Although evaluation results pertaining to a DVD+R were shown above in the present invention, due to the improved wobble quality, similar effects can also be achieved with optical discs of various kinds (CD-R, DVD-R, HDDVD-R, BD-R, and new generation).

While the invention has been shown and described with reference to preferred embodiments thereof, it is well understood by those skilled in the art that various changes and modifications can be made in the invention without departing from the spirit and scope of the invention as defined by the appended claims.

The invention claimed is:

1. A signal regenerator for extracting signal elements that are contained in analog signals regenerated from a light reflected off a disk comprising:
   a sample-and-hold signal generation circuit that generates sample-and-hold signals from at least one analog input signal obtained from the reflected light or directly from the light by means of photoelectric conversion, wherein the sample-and-hold signal generation circuit includes:
      a binarization circuit that compares the analog input signal with a prescribed threshold value in order to convert the analog input signal into a pulse signal; and
      a logic operation circuit that applies a logic operation to the pulse signal for generating the sample-and-hold signal; and
   a sample-and-hold circuit coupled to the analog input signal that samples and outputs the analog signal in response to the sample-and-hold signals.

2. The signal regenerator described in claim 1, wherein the logic operation circuit has an AND circuit or a NOR circuit.

3. The signal regenerator described in claim 1, further comprising a monitoring circuit that monitors the analog input signals, whereby the analog signals are output as is from the sample-and-hold circuit when the analog input signals do not reach the threshold values in a prescribed period of time.

4. The signal regenerator described in claim 1, wherein the signal extracted from the analog signals is a wobble signal.

5. The signal regenerator described in claim 1, wherein the signal extracted from the analog signals is a servo signal or an ROPC (Running Optimum Power Control) signal.

6. The signal regenerator described in claim 1, further comprising a monitoring circuit that monitors the analog input signals, whereby the analog signals are output as is from the sample-and-hold circuit when the analog input signals do not reach the threshold values in a prescribed period of time.

7. A signal regenerator for extracting signal elements that are contained in analog signals regenerated from a light reflected off a disk comprising:
   a sample-and-hold signal generation circuit that generates sample-and-hold signals from at least one analog input signal obtained from the reflected light or directly from the light by means of photoelectric conversion, wherein the sample-and-hold signal generation circuit includes:
      a binarization circuit that compares first, second, third, and fourth analog signals generated through photoelectric conversion by a photodetector with first, second, third, and fourth threshold values in order to convert the analog signals into first, second, third, and fourth pulse signals; and a logic operation circuit that applies a logical AND operation or a logical OR operation to the first, second, third, and fourth pulse signals for generating the sample-and-hold signals; and a sample-and-hold circuit coupled to the analog input signal that samples and outputs the analog signal in response to the sample-and-hold signals.

8. The signal regenerator described in claim 7, further comprising an arithmetic circuit that applies arithmetic processing to the first, second, third, and fourth analog signals in order to generate the analog signals, whereby the first, second, third, and fourth analog signals are generated from the reflected light.

9. The signal regenerator described in claim 8, wherein the arithmetic circuit has:

a first adder that generates a first sum signal representing the sum of the first analog input signal and the fourth analog input signal, a second adder that generates a second sum signal representing the sum of the second analog input signal and the third analog input signal, and a subtractor that generates a difference signal representing the difference between the first sum signal and the second sum signal; and the difference signal is input to the sample-and-hold circuit.

10. The signal regenerator described in claim 9, further comprising a monitoring circuit that monitors the analog input signals, whereby the analog signals are output as is from the sample-and-hold circuit when the analog input signals do not reach the threshold values in a prescribed period of time.

11. The signal regenerator described in claim 8, wherein the analog signal to be input to the sample-and-hold circuit is an RF signal obtained by adding up the first, second, third, and fourth analog input signals.

12. The signal regenerator described in claim 8, further comprising a monitoring circuit that monitors the analog input signals, whereby the analog signals are output as is from the sample-and-hold circuit when the analog input signals do not reach the threshold values in a prescribed period of time.

13. The signal regenerator described in claim 7, further comprising a monitoring circuit that monitors the analog input signals, whereby the analog signals are output as is from the sample-and-hold circuit when the analog input signals do not reach the threshold values in a prescribed period of time.

14. The signal regenerator described in claim 7, wherein the logic operation circuit further comprises a selection circuit, whereby an arbitrary signal is selected among the first, second, third, and fourth pulse signals supplied from the binarization circuit and is supplied to the AND circuit or the NOR circuit.

15. The signal regenerator described in one of claim 7, wherein the first, second, third, and fourth threshold values can be changed.

16. The signal regenerator described in claim 7, wherein the photodetector consists essentially of one of the group comprising a tetrameric photodetector, an octameric photodetector, or a spectroscopic photodetector.

17. A signal regenerator comprising:

a first analog processing circuit that applies analog signal processing upon receiving the input of multiple analog signals obtained through photoelectric conversion of reflected light;

a second analog processing circuit that applies analog processing upon receiving the input of the multiple analog signals;

a sampling pulse generation circuit that generates first and second sampling pulses upon receiving the input of the multiple analog signals;

a first sample-and-hold circuit that samples a signal output from the first analog processing circuit in response to the first sampling pulse;

a second sample-and-hold circuit that samples a signal output from the second analog processing circuit in response to the second sampling pulse; and a multiplexer that outputs signals output from the first and second sample-and-hold circuits selectively, wherein the sampling pulse generation circuit includes a binarization circuit that converts the multiple analog signals into respective pulse signals and a logic operation circuit that generates the first and second sampling pulse by applying a logic operation to the multiple pulse signals.

18. The signal regenerator described in claim 17, wherein the logic operation circuit has an AND circuit and a NOR circuit, whereby the first sampling pulse is generated by the AND circuit, and the second sampling pulse is generated by the NOR circuit.

19. The signal regenerator described under claim 18, wherein the sampling pulse generation circuit is further provided with a selection circuit to which the multiple pulse signals are input, and the selection circuit supplies the multiple pulse signals selectively to the AND circuit and the NOR circuit.

\* \* \* \* \*